United States Patent
Yamamura et al.

[11] Patent Number: 5,325,030
[45] Date of Patent: Jun. 28, 1994

[54] VOICE COIL MOTOR DRIVING CIRCUIT WITH RETRACTING FUNCTION

[75] Inventors: Norihisa Yamamura, Tokyo; Kotaro Okada, Narashino; Shunichi Utsumi, Tokyo, all of Japan

[73] Assignee: Motorola, Inc., Schaumburg, Ill.

[21] Appl. No.: 926,255

[22] Filed: Aug. 6, 1992

[30] Foreign Application Priority Data

Aug. 8, 1991 [JP] Japan ................................ 3-222475

[51] Int. Cl.$^5$ ................................ G05B 9/02
[52] U.S. Cl. ................................ 318/563; 318/560; 360/105
[58] Field of Search ................... 318/560, 563; 360/105

[56] References Cited
U.S. PATENT DOCUMENTS 4,807,062  2/1989  Onodera ................................ 318/563
4,903,157  2/1990  Malek ................................ 360/105
5,124,867  6/1992  Kitahori et al. ................... 360/105

Primary Examiner—William M. Shoop, Jr.
Assistant Examiner—Karen Masih
Attorney, Agent, or Firm—Charles R. Lewis; Gary W. Hoshizaki

[57] ABSTRACT

A voice coil motor driving circuit 10 with retracting function used in a disk drive unit for driving a read/write head by means of a voice coil motor VCM, comprising a voltage up-converter 12; a voice coil motor control circuit 16 for driving the voice coil motor during normal operation; a retract power source Vrr for supplying a retract current to the voice coil motor during head retract action; a retract control circuit 24 for allowing the retract current from the retract power source to the voice coil motor in response to a retract signal. The driving circuit also includes a capacitor C for providing an uninterrupted supply of voltage to the retract control circuit 24 during head retract action.

1 Claim, 1 Drawing Sheet

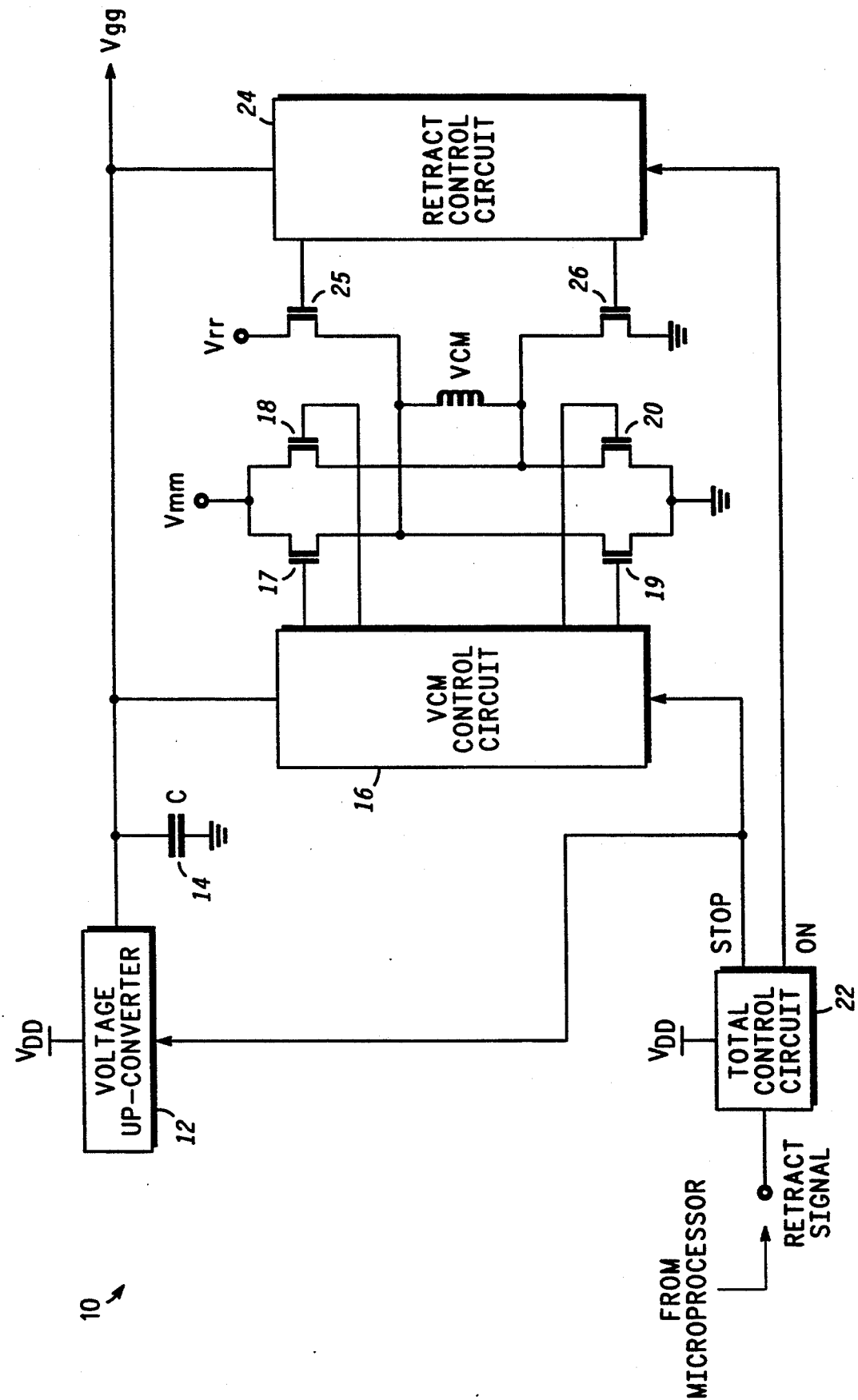

VOICE COIL MOTOR DRIVING CIRCUIT WITH RETRACTING FUNCTION

FIELD OF THE INVENTION

The present invention relates, in general, to a voice coil motor driving circuit with retracting function used in a disk drive unit, and more specifically to a voice coil motor driving circuit with retracting function for retracting a read/write head from a disk memory surface upon emergencies such as power down or upon a disk shutdown command.

BACKGROUND OF THE INVENTION

The use of a voice coil motor driving circuit in the field of magnetic disk drive units is well known in the prior art. A typical voice coil motor driving circuit has retracting function in which a read/write head of the disk drive unit can be retraced from a memory portion of the magnetic disk when disk operation is ceased or power is shut off. In the prior art it is common practice to include additional power supply such as a battery in a voice coil motor driving circuit with retracting function, for the purpose of supplying power to a retract control circuit which controls a retract current flowing through a voice coil motor. This additional battery requires additional cost and space in the voice coil motor driving circuit.

SUMMARY OF THE INVENTION

Accordingly, it is an object of the present invention to provide a voice coil motor driving circuit having retracting function without additional power supply, which can reliably supply power to a retract control circuit.

The foregoing and other objects are achieved in the present invention wherein there is provided a voice coil motor driving circuit with retracting function used in a disk drive unit for driving a read/write head by means of a voice coil motor. The driving circuit includes a voltage up-converter for receiving a power supply voltage and providing an increased voltage on an output terminal of the voltage up-converter; a voice coil motor control circuit receiving the increased voltage from the voltage up-converter, for driving the voice coil motor during normal operation; a retract power source for supplying a retract current to the voice coil motor during head retract action; a retract control circuit for allowing the retract current from the retract power source to the voice coil motor in response to a retract signal. The driving circuit also includes a capacitor placed in parallel with the output terminal of the voltage up-converter, for providing an uninterrupted supply of voltage to the retract control circuit during head retract action.

In a specific embodiment of the present invention, the retract power source of the driving circuit is supplied with power from the capacitor.

The foregoing and other objects and advantages will be apparent to one of skill in the art from the detailed description below taken together with the drawing.

BRIEF DESCRIPTION OF THE DRAWING

FIG. 1 is a schematic circuit diagram of a voice coil motor driving circuit with retracing function, embodying the present invention.

DETAILED DESCRIPTION OF THE INVENTION

The voice coil motor driving circuit with retracting function according to the present invention will now be described in detail with reference to a preferred embodiment thereof, which is illustrated in FIG. 1.

FIG. 1 is a schematic circuit diagram of a voice coil motor driving circuit 10 used in a magnetic disk drive unit (not shown), embodying the present invention. Voice coil motor driving circuit 10 includes a voltage up-converter 12 which receives a power supply voltage Vdd and provides an increased voltage Vgg onto its output terminal line. Voltage up-converter 12 may be a conventional voltage booster or step-up converter well known to an ordinary skilled person in this field. A capacitor C is connected between increased voltage line Vgg and a ground. The function of capacitor C will be described herein below. Voice coil motor driving circuit 10 also includes a voice coil motor control circuit 16 which receives increased voltage Vgg and controls the moving direction and strength of a voice coil motor VCM by controlling gates of MOSFETs 17-20 connected between a motor power source Vmm and the ground and connected to both terminals of voice coil motor VCM. Voice coil motor VCM drives a read/write head (not shown) of the magnetic disk drive unit. Therefore, voice coil motor control circuit 16 can control the motion of the read/write head of the magnetic disk drive unit. Voice coil motor control circuit 16 may be constructed as multi-input logic circuit with conventional logic technique well known in the art. In this normal operation, motor power source Vmm supplies a motor driving current to voice coil motor VCM.

Voice coil motor driving circuit 10 further includes a total control circuit 22 which receives a retract signal from a microprocessor (not shown). When the power of the magnetic disk drive unit is shut off or a disk stop command is given, the microprocessor transmits the retract signal to total control circuit 22. In response to the retract signal, total control circuit 22 outputs a STOP signal and ON signal to voltage up-converter 12 and VCM control circuit 16, and a retract control circuit 24 respectively. The STOP signal stops the operation of voltage up-converter 12, and the output terminal of voltage up-converter 12 becomes high impedance state and therefore a counter current flow from capacitor C to up-converter 12 is inhibited. The STOP signal also stops the operation of VCM control circuit 16 to disables the driving current supply from flowing to voice coil motor VCM. In response to the ON signal from total control circuit 22, retract control circuit 24 turns on both of MOSFETs 25, 26, and enables a retracting current from a retract power source Vrr to voice coil motor VCM. Thus, voice coil motor operates (retracts) in a desired direction and drives the read/write head away from disk memory portion to a retract position.

During the retracting action, voltage up-converter 12 does not provide power voltage Vgg. Instead, capacitor C holding electric charge can provide power to retract control circuit 24. Therefore, retract control circuit 24 can reliably operates to retract the head even when the main power is suddenly shut off. Retract power Vrr can be obtained from the back electromotive force of a spindle motor for rotating the disk. Alternatively capacitor C can be utilized also to supply power to retract power source Vrr.

While the present invention has been shown and described with reference to a particular embodiment thereof, various modifications and changes thereto will be apparent to those skilled in the art and are within the spirit and scope of the present invention.

We claim:

1. A voice coil motor driving circuit with retracting function used in a disk drive unit for driving a read/write head by means of a voice coil motor, comprising:

a voltage up-converter for receiving a power supply voltage and for providing an increased voltage on an output terminal of said voltage up-converter, said voltage up-converter being disabled during the retracting function;

a voice coil motor driver having MOS FETs for driving said voice coil motor during normal operation;

a voice coil motor control circuit for receiving the increased voltage from said voltage up-converter and for controlling said voice coil motor driver during normal operation;

a voice coil motor retract driver having MOS FETs for driving said voice coil motor to a retract position during the retracting function;

a retract control circuit for controlling said voice coil motor retract driver; and a capacitor coupled to the output terminal of said voltage up-converter for providing an uninterrupted supply of voltage to said retract control circuit during the retracting function.

* * * * *